United States Patent
Gustavsson

(10) Patent No.: US 6,374,019 B1
(45) Date of Patent: Apr. 16, 2002

(54) OPTICAL DEVICE

(75) Inventor: Mats Gustavsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/333,955

(22) Filed: Jun. 16, 1999

(30) Foreign Application Priority Data

Jun. 17, 1998 (SE) ............................................. 9802168

(51) Int. Cl.[7] ................................................. G02B 6/26
(52) U.S. Cl. ........................... 385/42; 385/37; 385/24; 359/124; 359/130; 359/341
(58) Field of Search ............................. 385/24, 37, 42, 385/41; 359/124, 126, 130, 341

(56) References Cited

U.S. PATENT DOCUMENTS

| | | | |
|---|---|---|---|
| 5,416,866 A | 5/1995 | Sahlén | |
| 5,502,783 A | 3/1996 | Wu | |
| 5,621,828 A | * 4/1997 | Baets et al. | 385/37 |
| 5,710,849 A | 1/1998 | Little et al. | |
| 5,832,148 A | * 11/1998 | Yariv | 385/16 |
| 5,859,941 A | * 1/1999 | Horita et al. | 385/37 |
| 6,014,480 A | * 1/2000 | Baney | 385/24 |

FOREIGN PATENT DOCUMENTS

| | | | |
|---|---|---|---|
| EP | 0 475 016 A2 | 3/1992 | |
| EP | 0 778 479 A2 | 6/1997 | |
| GB | 2265059 A | * 9/1993 | 385/37 |
| WO | WO 97/15851 | 5/1997 | |

OTHER PUBLICATIONS

Hibino et al., "Wavelength Division Multipelxer with Photoinduced Bragg Gratings Fabricated in a Planar Lightwave Circuit Type Asymmetric Mach Zehnder Interferometer on Si," *IEEE Photonics Technology Letters*, vol. 8, No. 1, pp. 84–86, Jan. 1996.

Cheung et al., "Wavelength–Selective Circuit and Packet Switching Using Acousto–Optic Tunable Filters," *Globecom '90*, vol. 3 of 3, pp. 1541–1547, Dec. 2–5, 1990.

Alferness et al., "Broadly Tunable InGaAsP/InP Buried Rib Waveguide Vertical Coupler Filter," *Techn. Dig. Integrated Photonic Research, Post–Deadline Paper*, pp. 30–36, Apr. 9–11, 1991.

* cited by examiner

*Primary Examiner*—Darren Schuberg
*Assistant Examiner*—Fayez Assaf
(74) *Attorney, Agent, or Firm*—Burns, Doane, Swecker & Mathis, L.L.P.

(57) ABSTRACT

The present invention concerns a multi-wavelength selective switch in the form of a directional coupler structure. The directional coupler structure comprises two waveguides, wherein the waveguides arranged exhibit different effective diffractive index. The waveguides in one section are arranged in the proximity of each other, such that an optical field in the first waveguide can overlap a second waveguide and vice versa and that in said section at least two gratings are arranged for co-directional coupling. Said gratings are arranged isolated from each other. The invention further comprises a method for switching of wavelength channels through the use of said multi-wavelength selective switch.

27 Claims, 1 Drawing Sheet

OPTICAL DEVICE

This application claims priority under 35 U.S.C. §§119 and/or 365 to 9802168-6 filed in Sweden on Jun. 17, 1998; the entire content of which is hereby incorporated by reference.

FIELD OF THE INVENTION

The present invention relates to an optical multi-wavelength selective device, more precisely a multi-wavelength selective switch for rerouting and switching of wavelengths in an optical network, in which each wavelength may be separately rerouted. The invention also comprises a method for rerouting and switching or add/drop multiplexing of wavelengths in an optical network.

BACKGROUND OF THE INVENTION

In order to further increase the capacity on existing optical networks a number of methods are known. One means is to use so called wavelength division multiplexing (WDM) technique in order to improve the degree of utilization of the available bandwidth. In order to increase the network flexibility, devices able to reroute traffic in the optical network are necessary. Such devices for rerouting of the traffic are also suitable in order to utilize the network as efficiently as possible, and in case of network interrupts.

In "Wavelength Division Multiplexer with Photoinduced Bragg Gratings Fabricated in a Planar Lightwave Circuit Type Asymmetric Mach Zehnder Interferometer on Si" Y. Hibino et.al., IEEE Photonics Technology Letters, Vol. 8, No. 1, January 1996 an optical element is described in which Bragg grating and a phase control element is used in a Mach Zehnder interferometer. The considered applications are wavelength division multiplexing and wavelength division de-multiplexing.

The above described device can however not be used as a multi-wavelength selective switch. If the described device is to be used for add/drop of several channels, as many devices are needed as the number of handled add/drop pairs. This type of device is comparatively hard to reconfigure, i.e. it is a non-adaptable device.

In K. W. Cheung, D. A. Smith, J. K. Baran, J. J. Johnson: "Wavelength-selective circuit and packet switching using acousto-optic tunable filters" Globecom '90, pp 1541–1547, 1990, a manner is described of solving multi-wavelength selective rerouting of wavelength channels separate and independently of each other based on opto-aucoustic switches. This type of rerouting typically uses a number of micro-seconds, which may be a problem in high speed transmissions.

In R. C. Alferness, L. L. Buhl, U. Koren, B. I. Miller, M. Young, T. L. Koch." Broadly tunable InGaAsP/InP buried rib waveguide vertical coupler filter", Techn. Dig. Integrated Photonics Research, post-deadline paper, pp. 33–36, 1991 a tunable wavelength selective grating-assisted directional coupler comprising two waveguides having different effective refractive indexes and a grating described. This directional coupler can couple a wavelength from the first waveguide to the second waveguide.

The problem present in the known technique as regards multi-wavelength selective switches and re-directional devices is this demand very big and complicated structures or more components, which results in big power losses and high costs, or in that they can not be used in connection with high speed transmissions.

SUMMARY OF THE INVENTION

In order to increase the capacity in an optical transmission system several know methods may be used. In wavelength division multiplexing the transmission channels are multiplexed and de-multiplexed on different carrier wavelengths to respectively from an information flow. Said multiplexing and de-multiplexing demands optical multi-wavelength selective devices. It may also be desirable to change the transmission route through the optical net for certain wavelength channels. For this purpose components are needed having multi-wavelength selective performance characteristics such as a multi-wavelength selective switch.

A known problem related to multi-wavelength selective switches may be that these contribute to big power losses.

Another problem is that all by us known multi-wavelength selective switches known to us exhibited a relatively complicated structure or a great number of components.

Another problem is that known multi-wavelength selective switches are relatively expensive to manufacture depending on said complicated structures or the number of components comprised.

Yet a problem is that certain known multi-wavelength selective switches exhibit relatively slow switching speeds, typically a number of microseconds.

The present invention approaches the said problem through a multi-wavelength selective switch in the form of a directional coupler structure comprising two waveguides arranged having different effective refractive index. The waveguides are at one section arranged in the proximity of each other, such that an optical field in each of the waveguides may overlap the other wherein at least one grating is arranged for co-directional coupling.

In a method according to the invention for switching and re-direction of optical wavelengths in an optical network one branch in a directional coupler structure comprising optical wavelengths is excited. The optical wavelengths are thereafter transmitted through said branch to the directional coupler structure. The optical wavelengths are thereafter transmitted through a section where the waveguides are arranged in the proximity of each other whereby none or at least one wavelength is influenced by at least one in this section arranged grating for co-directional coupling and is coupled to the other waveguide.

In a second embodiment according to the invention at least one wavelength selective amplifier is comprised in at least one branch of the directional coupler structure, e.g. in the form of a distributed-Bragg-reflector-amplifier.

The object of the present invention is to obtain a multi-wavelength selective switch, the structure of which is so simple and compact as possible, such that the manufacturing thereby may be reduced compared to the available technique, and in which the switching speed still is relatively high.

An advantage of the present invention is that the power losses relatively seen may be kept low.

A further advantage of the present invention is that its remaining performance characteristics such as crosstalk and the like may be improved compared to know technique.

Still a further advantage of the present invention is that signal splitting only is performed when absolutely necessary.

The invention will now be described further using the preferred embodiments and with reference to the appended drawings.

PREFERRED EMBODIMENTS OF THE INVENTION

Figure 1:
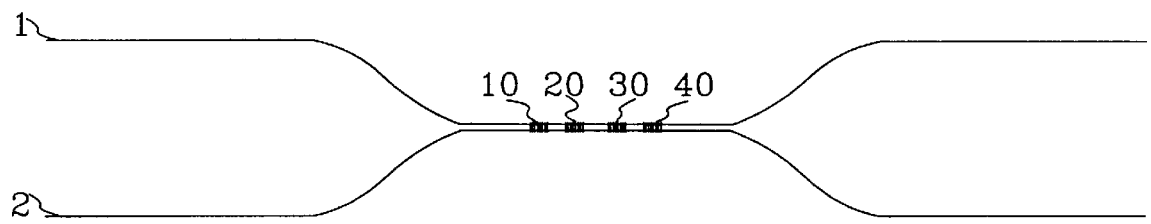
FIG. 1 shows an embodiment of a multi-wavelength selective switch according to the invention.

A multi-wavelength selective switch in the form of a directional coupler structure comprising two waveguides 1 and 2 and four gratings for co-directional coupling 10, 20, 30, and 40 is shown in FIG. 1. Said waveguides 1 and 2 are each arranged having different effective refractive indexes, i.e. the propagation speed of light is different in the two waveguides. In on section these waveguides 1 and 2 are arranged in the proximity of each other such that an optical field from each of the waveguides may overlap the other. On each side of this section there are two branches of the waveguides. In the section in which the waveguides are arranged in the proximity of each other, four gratings are arranged for co-directional coupling 10, 20, 30, and 40. Said section is called a grating section. These gratings 10, 20, 30, and 40 may, depending on their character as to repetivity and length, bring about that certain wavelength may be coupled from a first waveguide to a second waveguide. The gratings may be looked upon as some kind of a phase matching device, which allows certain wavelengths to be coupled from one waveguide exhibiting a first effective refraction index to a second waveguide exhibiting a second effective refraction index. In phase matching one wavelength is coupled from one waveguide to another, and this corresponds thus to a cross coupling state for this wavelength. In phase mismatch no wavelengths are coupled between the waveguides and this thus corresponds to a bar coupler state for these wavelengths. The gratings 10, 20, 30, and 40 are arranged in said section such that the phase matching conditions may be separately influence for each section, i. e. some type of isolation is present between the gratings 10, 20, 30, and 40 such that they as far as possible do not influence each other. A control signal for one grating section should only influence that one and none of the other grating sections.

Suppose that waveguide 1 is excited with an optical signal comprising four different wavelengths $\lambda 1$, $\lambda 2$, $\lambda 3$, and $\lambda 4$. These wavelengths will be transmitted through said waveguide 1 and arrive at the section in which the waveguides have been arranged in the proximity of each other, i.e. at the different grating sections. In the case that the waveguides 1 and 2 exhibit the same effective refractive index and the gratings for co-directional coupling 10, 20, 30, and 40 are not present, the power of the different wavelengths may be divided up essentially alike in the two waveguides. In the present invention the different waveguides 1 and 2 exhibit different effective refractive indexes, which implies that the different wavelengths in the optical signal, in absence of any type of phase matching device, will not, or only to a very small extent be coupled from one waveguide to another. The gratings for co-directional coupling 10, 20, 30, and 40, which constitute phase matching devices are so constituted as to each control a certain wavelength.

The gratings 10, 20, 30, and 40 may be controlled using an electrical signal, which implies that a grating which in an un-controlled state will influence a certain wavelength, will influence another wavelength in a controlled state. Through this mechanism in the gratings for co-directional coupling each and every one of the excited wavelengths $\lambda 1$, $\lambda 2$, $\lambda 3$, and $\lambda 4$ may be influenced independently of the other. The degree of phase match may be controlled using this electrical signal. In a so called broadcast state, the optical signal is distributed evenly between the two waveguides for a given wavelength. Preferably, each grating section is so designed, that it in at least one state, which is controlled by the grating section control signal, is phase mismatched for all wavelengths in the incoming signal, i.e. none of the incoming wavelengths are coupled from its incoming waveguide.

In the case described above where four wavelengths $\lambda 1$, $\lambda 2$, $\lambda 3$, and $\lambda 4$ are present in the section where the waveguides are coupled to each other and which also comprises said grating, a certain wavelength may by application of a suitable current for each of the gratings be directed to any of the branches which exits said section. Each wavelength which is coupled into the waveguide 1 may be coupled out into the waveguide 1 and/or 2.

Figure 2:
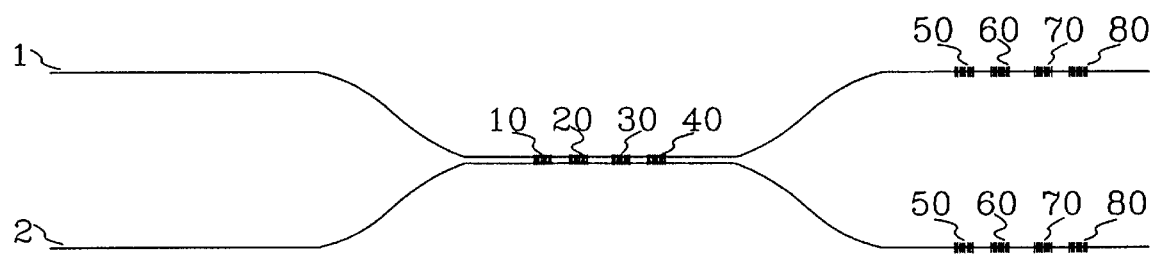
FIG. 2 shows another embodiment of a multi-wavelength selective switch according to the invention.

In FIG. 2 another embodiment of the multi-wavelength selective switch according to the invention is seen. The multi-wavelength selective switch comprises in this embodiment a directional coupler structure in the form of two waveguides 1 and 2 and four gratings for co-directional coupling 10, 20, 30, and 40 and eight wavelength selective optical amplifiers 50, 60, 70, 80. Said two waveguides, 1 and 2, are each arranged exhibiting different effective refractive indexes, i.e. the propagation speed of light is different in the two waveguides. In on section these waveguides, 1 and 2, are arranged in the proximity of each other, such that an optical field from each of the waveguides may overlap the other. On each side of this section there are two branches of the waveguides. In the section, in which the waveguides are arranged in the proximity of each other, four gratings are arranged for co-directional coupling 10, 20, 30, and 40. Said section is called a grating section. These gratings 10, 20, 30, and 40 may, depending on their character as to repetivity and length, bring about that certain wavelength may be coupled from a first waveguide to a second waveguide.

The gratings 10, 20, 30, and 40 are arranged in said section such that the phase matching conditions may be separately influence for each section, i. e. some type of isolation is present between the gratings 10, 20, 30, and 40, such that they as far as possible do not influence each other. A control signal for one grating section should only influence that one and none of the other grating sections.

In this embodiment wavelength selective optical amplifiers 50, 60, 70, 80 have been arranged in the branches on one side of the section, where the waveguides are in contact with each other, in order to differentially amplify the wavelength division multiplexed signals. In the broadcasting state the optical signal is distributed between the incoming waveguides, which implies that the intensity of light in each waveguide may be reduced to half the intensity when the signal is evenly distributed between the two waveguides.

This may be compensated by introducing a number, preferably the same number as the number of wavelengths, of wavelength selective optical amplifiers, such as current controlled distributed Bragg-reflector (DBR) amplifiers or quarter-wavelength chirping DBF amplifiers in the branches neighbouring to the section where the guides are in the proximity of each other. These amplifiers may be used for compensating the differences in signal strength for different wavelengths.

Every branch in this embodiment comprises as many wavelength selective optical amplifiers 50, 60, 70, 80 as the number of gratings for co-directional coupling 10, 20, 30, and 40 in the section in which the waveguides are arranged in the proximity of each other. In each branch the wavelength division multiplexed signals may be amplified differentially. This may be of importance in case a wavelength has been divided between the two waveguides an thus has decreased its intensity.

The wavelength selective optical amplifiers and the gratings for co-directional coupling may be manufactured according to methods well known to one skilled in the art and thus hardly needs to be described further.

The present multi-wavelength selective switch may be manufactured as monolithic integrated optical components in any dielectric material, e.g. in a material comprising elements from groups III–V of the periodic table of the chemical elements such as the system InGeAsP/InP.

The invention is naturally not limited to the above described and the embodiments shown on the drawings, but can be modified within the scope of the appended claims.

What is claimed is:

1. A multi-wavelength selective switch for switching and redirecting optical wavelengths, wherein the switch is arranged in the form of a directional coupler structure, the switch comprising:
   first and second waveguides that are separate and distinct throughout their length,
   wherein the first and second waveguides exhibit different effective refractive indices and
   wherein the waveguides in one section are arranged in proximity of each other, such that an optical field in the first waveguide can overlap the second waveguide and vice versa; and
      at least two gratings arranged for co-directional coupling in said section, wherein said gratings are arranged isolated from each other.

2. A multi-wavelength selective switch according to claim 1, wherein all gratings are arranged having a same grating repetivity.

3. A multi-wavelength selective switch according to claim 2, wherein in at least one branch of the directional coupler structure at least one wavelength selective optical amplifier is arranged.

4. A multi-wavelength selective switch according to claim 3, wherein the wavelength selective optical amplifier is a current-controlled distributed-Bragg-reflector (DBR) amplifier.

5. A multi-wavelength selective switch according to claim 4, wherein said switch is manufactured from a dielectric material.

6. A multi-wavelength selective switch according to claim 5, wherein said dielectric material is the system InGeAsP/InP.

7. A multi-wavelength selective switch according to claim 5, wherein said switch is manufactured from a semiconductor system comprising elements from groups III–V of the periodic table of the chemical elements.

8. A multi-wavelength selective switch according to claim 7, wherein said elements include In, Ge, As and P.

9. A multi-wavelength selective switch according to claim 7, wherein the gratings for co-directional coupling are controllable by electrical signals.

10. A multi-wavelength selective switch according to claim 9, wherein the gratings are controllable independently.

11. A multi-wavelength selective switch according to claim 1, wherein at least one grating is arranged having a grating repetivity which differs from the repetivity of the other gratings.

12. The multi-wavelength selective switch according to claim 1, wherein said co-directional coupling in said section is co-directional coupling of wavelengths between said first and second waveguides in said section.

13. The multi-wavelength selective switch according to claim 1, wherein said first and second waveguides are arranged substantially parallel to one another and spaced apart from one another in said section.

14. The multi-wavelength selective switch according to claim 13, wherein said gratings are arranged between said first and second waveguides in said section.

15. A method for switching and redirecting optical wavelengths in an optical network, comprising:
   coupling the optical wavelengths into one branch of a directional coupler structure;
   transmitting the optical wavelengths through said branch of the directional coupler structure; and
   transmitting the optical wavelengths through a section in which first and second waveguides are arranged in proximity of each other, the first and second waveguides being separate and distinct throughout their length, wherein none or at least one wavelength in one of said first and second waveguides is influenced by at least one grating for co-directional coupling in said section and is co-directionally coupled to the other of said first and second waveguides,
   wherein the grating for co-directional coupling is arranged in said section, and
   wherein the grating for co-directional coupling is influenced by an electrical signal.

16. The method according to claim 15, wherein in at least one branch of the directional coupler structure at least one wavelength is amplified by a wavelength selective amplifier.

17. The method according to claim 16, wherein the wavelength selective optical amplifier is influenced by an electrical signal.

18. The method according to claim 15, wherein in at least one branch of the directional coupler structure at least one wavelength is amplified by a wavelength selective amplifier and wherein said wavelength selective amplifier is influenced by another electrical signal.

19. The method according to claim 15, wherein said first and second waveguides are arranged substantially parallel to one another and spaced apart from one another in said section.

20. The multi-wavelength selective switch according to claim 19, wherein said at least one grating is arranged between said first and second waveguides in said section.

21. The method according to claim 15, wherein said first and second waveguides have different effective refractive indices.

22. A multi-wavelength selective switch comprising:
   first and second waveguides with different effective refractive indices, the first and second waveguides being arranged in proximity to each other along a section, the first and second waveguides being separate and distinct throughout their length; and at least two gratings disposed in said section, the gratings being isolated from each other and enabling coupling between the first and second waveguides, wherein the gratings are gratings for co-directional switching and redirection of wavelengths between the first and second waveguides.

23. The multi-wavelength selective switch according to claim 22, wherein said gratings are controllable independently to provide separate switching and redirection of different wavelengths.

24. The multi-wavelength selective switch according to claim 22, wherein said first and second waveguides are arranged substantially parallel to one another and spaced apart from one another in said section.

25. The multi-wavelength selective switch according to claim 24, wherein said gratings are arranged between said first and second waveguides in said section.

26. The multi-wavelength selective switch according to claims 22, further comprising at least one wavelength selective amplifier disposed along at least one of said first and second waveguides, said wavelength selective amplifier being controllable to amplify a wavelength.

27. A multi-wavelength selective switch comprising:

first and second waveguides with different effective refractive indices, the first and second waveguides being separate and distinct throughout their length and each of the first and second waveguides extending through a first section of said multi-wavelength selective switch, through a second section of said multi-wavelength selective switch, and through a third section of said multi-wavelength selective switch, the second section being disposed between the first and third sections, wherein a separation between the first and second waveguides in the second section is smaller than a separation between the first and second waveguides in either of the first and third sections, the separation between the first and second waveguides in the second section being such that an optical field in the first waveguide can overlap the second waveguide and such that an optical field in the second waveguide can overlap the first waveguide; and at least two gratings disposed in the second section, the gratings being isolated from each other and enabling co-directional switching and redirection of wavelengths in the second section from the first waveguide to the second waveguide and from the second waveguide to the first waveguide.

* * * * *